(12) United States Patent
Kase et al.

(10) Patent No.: US 9,841,973 B2
(45) Date of Patent: Dec. 12, 2017

(54) INFORMATION PROCESSING APPARATUS AND METHOD OF CONTROLLING INFORMATION PROCESSING APPARATUS

(71) Applicant: FUJITSU LIMITED, Kawasaki-shi, Kanagawa (JP)

(72) Inventors: Masaru Kase, Kawasaki (JP); Toshiyuki Shimizu, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 273 days.

(21) Appl. No.: 14/446,386

(22) Filed: Jul. 30, 2014

(65) Prior Publication Data

US 2015/0067304 A1    Mar. 5, 2015

(30) Foreign Application Priority Data

Aug. 28, 2013  (JP) ................. 2013-176974

(51) Int. Cl.
*G06F 1/14* (2006.01)
*G06F 1/12* (2006.01)
(Continued)

(52) U.S. Cl.
CPC ............ *G06F 9/3001* (2013.01); *G06F 1/324* (2013.01); *G06F 1/3206* (2013.01);
(Continued)

(58) Field of Classification Search
CPC ...... G06F 1/3206; G06F 9/3001; G06F 1/324; G06F 9/30021; G06F 9/4887; G06F 9/4893; G06F 9/522; G06F 1/3296; Y02B 60/144
(Continued)

(56) References Cited

U.S. PATENT DOCUMENTS 4,639,864 A * 1/1987 Katzman ............ G06F 12/1458
                                                    711/E12.093
8,065,459 B2    11/2011 Bekooij
(Continued)

FOREIGN PATENT DOCUMENTS

EP      2031510 A1    3/2009
JP      11-134804     5/1999
(Continued)

OTHER PUBLICATIONS

Extended European Search Report dated Mar. 24, 2016 for corresponding European Patent Application No. 14177385.3, 7 pages.
(Continued)

*Primary Examiner* — Robert Cassity
(74) *Attorney, Agent, or Firm* — Fujitsu Patent Center

(57) ABSTRACT

An information processing apparatus includes a plurality of arithmetic processing devices, a common timer unit configured to measure time in common among the plurality of arithmetic processing devices, a plurality of individual timer units to measure execution time of a program per plurality of arithmetic processing devices, a comparing unit configured to compare the program execution time of each of the plurality of arithmetic processing devices, the program execution time being measured by the plurality of individual timer units, with time measured by the common timer unit, and a control unit configured to control processing of the plurality of arithmetic processing devices on the basis of a result of the comparison made by the comparing unit.

7 Claims, 5 Drawing Sheets

(51) Int. Cl.
  *G06F 15/16* (2006.01)
  *G06F 9/30* (2006.01)
  *G06F 9/48* (2006.01)
  *G06F 9/52* (2006.01)
  *G06F 1/32* (2006.01)

(52) U.S. Cl.
  CPC ........ *G06F 9/30021* (2013.01); *G06F 9/4887* (2013.01); *G06F 9/4893* (2013.01); *G06F 9/522* (2013.01); *G06F 1/3296* (2013.01); *Y02B 60/1217* (2013.01); *Y02B 60/144* (2013.01)

(58) Field of Classification Search
  USPC .................................................. 713/375, 300
  See application file for complete search history.

(56) References Cited

U.S. PATENT DOCUMENTS

| | | | |
|---|---|---|---|
| 2002/0111696 A1 | 8/2002 | Albrecht et al. | |
| 2007/0157206 A1* | 7/2007 | Rakvic | G06F 9/4893 718/102 |
| 2008/0115143 A1* | 5/2008 | Shimizu | G06F 9/5066 718/105 |
| 2009/0172424 A1* | 7/2009 | Cai | G06F 1/3203 713/300 |
| 2010/0005323 A1* | 1/2010 | Kuroda | G06F 1/3203 713/300 |
| 2011/0119677 A1 | 5/2011 | Saito | |
| 2012/0131586 A1 | 5/2012 | Kang et al. | |
| 2014/0143580 A1* | 5/2014 | Vahidsafa | G06F 1/12 713/400 |

FOREIGN PATENT DOCUMENTS

| | | |
|---|---|---|
| JP | 2002-258980 | 9/2002 |
| JP | 2006-172229 A | 6/2006 |
| WO | 2007/141849 A1 | 12/2007 |

OTHER PUBLICATIONS

Japanese Office Action dated Mar. 21, 2017 for corresponding Japanese Application No. 2013-176974, with Partial English Translation, 6 pages.

* cited by examiner

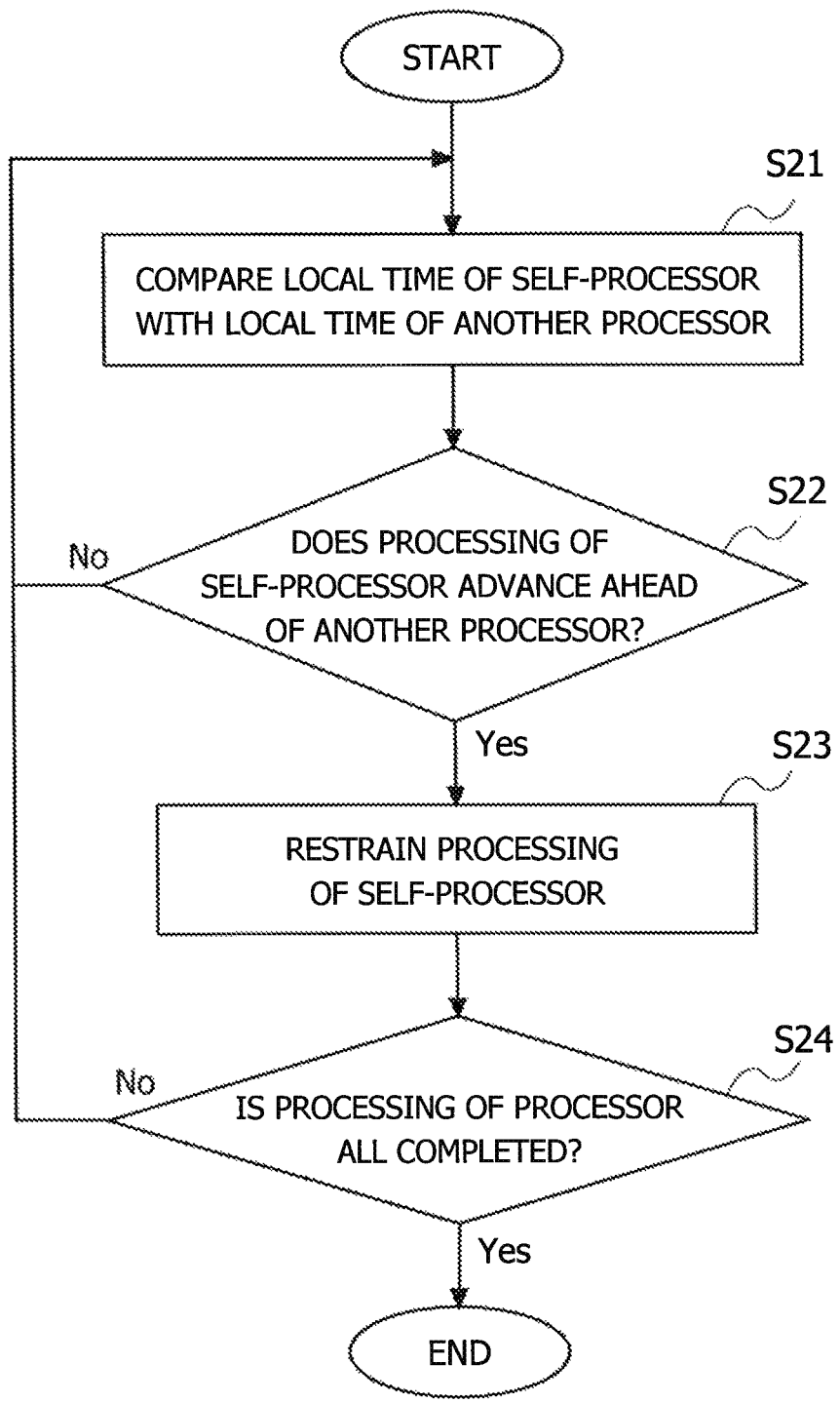

INFORMATION PROCESSING APPARATUS AND METHOD OF CONTROLLING INFORMATION PROCESSING APPARATUS

CROSS-REFERENCE TO RELATED APPLICATION

This application is based upon and claims the benefit of priority of the prior Japanese Patent Application No. 2013-176974, filed on Aug. 28, 2013, the entire contents of which are incorporated herein by reference.

FIELD

The present invention relates to an information processing apparatus and to a method of controlling the information processing apparatus.

BACKGROUND

In recent years, there has widely been utilized a parallel computing technology contrived to speed up processing by distributing one task with processors serving as a plurality of arithmetic processing devices. In this type of parallel computing system, there are processor connection systems classified into a system called a loosely-coupled multiprocessor system in which plural computers are connected via a network and a system called a tightly-coupled multiprocessor system in which the processors are coupled at a bus level. Further, a chip multiprocessor (CMP) configured by integrating a plurality of processors on the same chip was utilized and has reached a spread.

Further, technologies with respect to the CMP appear on the market, such as a DVFS (Dynamic Voltage and Frequency Scaling) technology of operating the processor in the way of dynamically varying a clock frequency and a voltage on a processor-by-processor basis and a technology of operating some of the plurality of processors at a high speed in excess of a rated operating frequency if there is an allowance for thermal design electric power of whole chips of these processors.

Herein, when a certain task is processed by the parallel computing system, e.g., an operating system (OS) at first divides the task into proper processing units. The processing units are considered to be a program, a process, a thread and so on. Supposing that the task is divided into the threads, this task allocates the divided threads to the plurality of processors, and the threads are processed in parallel. Then, the task waits till each processor completes processing and moves to a next process. Incidentally, an event that the task etc. waits for each processor to complete the processing is also termed "taking synchronization". Thus, a distributed processing method by which the plurality of processors processes the threads etc. in parallel enables the parallel computing system to execute the processing at the high speed.

DOCUMENTS OF PRIOR ARTS

Patent Document

[Patent document 1] Japanese Laid-Open Patent Publication No. 11-134804
[Patent document 2] Japanese Laid-Open Patent Publication No. 2002-258980

SUMMARY

One aspect of the embodiment is exemplified by an information processing apparatus. The information processing apparatus includes: a plurality of arithmetic processing devices; a common timer unit configured to measure time in common among the plurality of arithmetic processing devices; an individual timer unit configured to measure execution time of a program per plurality of arithmetic processing devices; a comparing unit configured to compare the program execution time of each of the plurality of arithmetic processing devices, the execution time being measured by the individual timer unit, with time measured by the common timer unit; and a control unit configured to control processing of the plurality of arithmetic processing devices on the basis of a result of the comparison made by the comparing unit.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 5 is a flowchart illustrating one example of the execution control processing procedure of the processor in the second working example.

DESCRIPTION OF EMBODIMENTS

Figure 1:
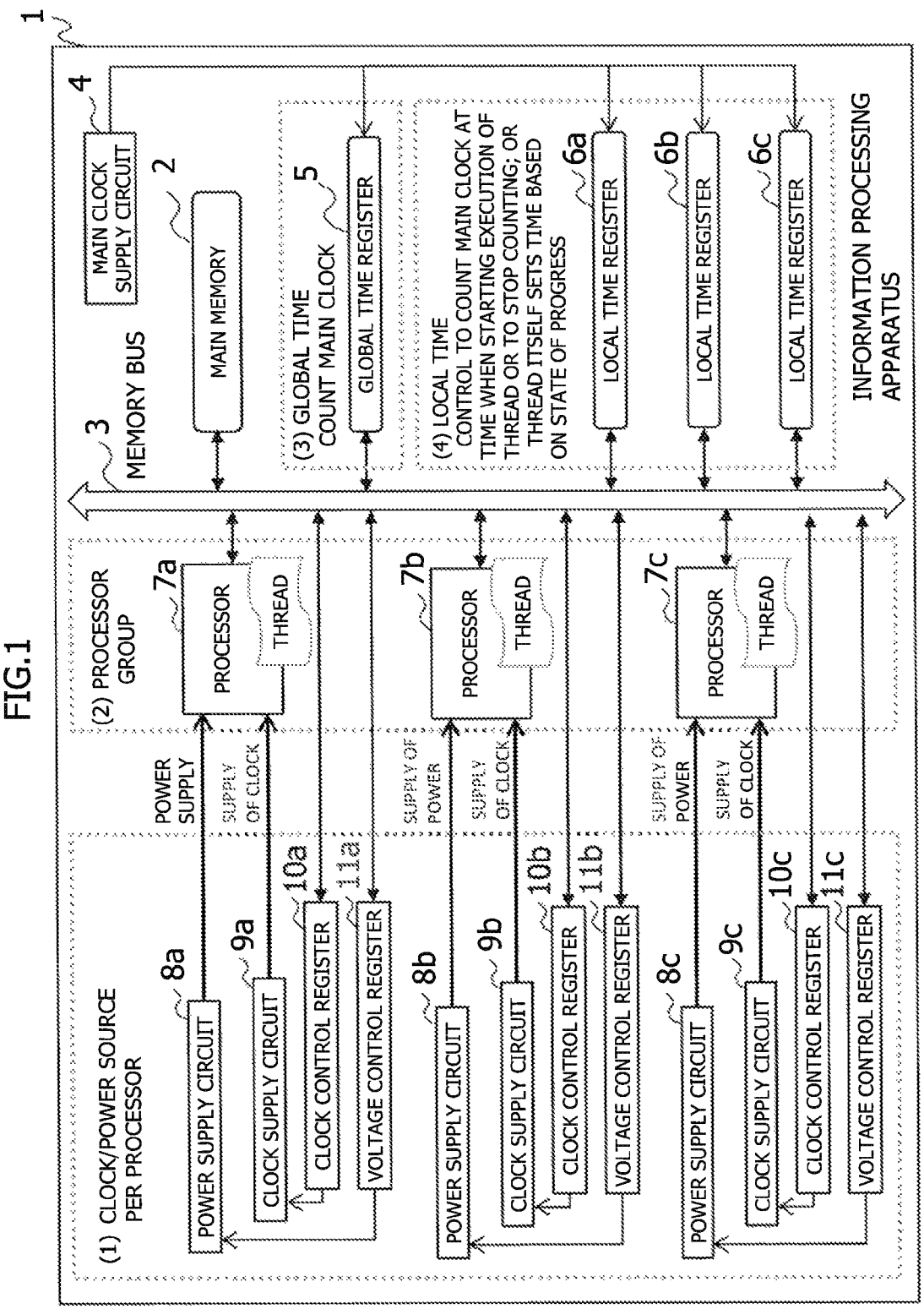
FIG. 1 is a diagram illustrating one example of hardware architecture of an information processing apparatus.

It is desirable in terms of processing efficiency in the parallel processing method described above that the processes allocated to the respective processors are completed without a time difference to the greatest possible degree.

Even when the processes are allocated evenly to the respective processors, however, a delay occurs due to a factor such as traffic between the processors, an imbalance between memory bands, a cache miss and the processing of the OS, and hence it does not happen inmost cases that all the processors finish processing simultaneously. If the time difference occurs in timings when the respective processors complete the processing, a length of waiting time for the synchronization elongates, resulting in a decrease in throughput on the whole. It is therefore desirable that none or a less of the time difference occurs in the timings when the individual processors complete the processing.

An embodiment of the present invention will hereinafter be described based on the drawings. A configuration of the following embodiment is an exemplification, and the present invention is not limited to the configuration of the embodiment.

A computer serving as an information processing apparatus given by way of one aspect of the embodiment of the present invention includes processors as a plurality of arithmetic processing devices. Further, a unit of a set of processes executed by the information processing apparatus is to be called a "task". The information processing apparatus subdivides the task into a plurality of processing units each called a "thread". In the present working example, the processing unit is assumed to be the thread, however, may also be a program, a process, etc. The information processing apparatus allocates the subdivided threads to the respective processors. Each processor, for reducing a time difference in executing the thread between the self-processor and another processor, accelerates or restrains processing by controlling a clock frequency and a voltage value of the self-processor. To be specific, each processor measures a length of thread processing time and, if the processing is delayed, accelerates the processing. On the other hand, the processor restrains the processing if the processing advances ahead. A processing speed is controlled at a fixed interval, thereby enabling a reduction of the time difference in executing the thread between the processors.

Note that the plurality of processors, in a parallel computing system according to the embodiment of the present invention, is not limited to be coupled at a bus level in the information processing apparatus. In the parallel computing system, the plurality of processors may be included in a plurality of computers connected via a network or may be included on the same chip.

First Working Example

The first working example is that each of the plurality of processors determines whether the processing of the self-processor is delayed or not by comparing the thread execution time in each individual processing environment with measurement time by a global timer for measuring the time in common within an information processing apparatus 1. Each processor accelerates the processing if determining that the processing of the self-processor de delayed.

<Hardware Architecture>

FIG. 1 is a diagram illustrating one example of hardware architecture of the information processing apparatus 1. In FIG. 1, the information processing apparatus 1 includes a main memory 2, a memory bus 3, a main clock supply circuit 4, a global time register 5, a local time registers 6a, 6b 6c, processors 7a, 7b, 7c, power supply circuits 8a, 8b, 8c, clock supply circuits 9a, 9b, 9c, clock control registers 10a, 10b, 10c and voltage control registers 11a, 11b, 11c.

The local time registers 6a, 6b, 6c are, when generically termed, referred to as the local time register 6. The processors 7a, 7b, 7c are, when generically termed, referred to as the processor 7. The power supply circuits 8a, 8b, 8c are, when generically termed, referred to as the clock supply circuit 8. The clock supply circuits 9a, 9b, 9c are, when generically termed, referred to as the clock supply circuit 9. The clock control registers 10a, 10b, 10c are, when generically termed, referred to as the clock control register 10. The voltage control registers 11a, 11b, 11c are, when generically termed, referred to as the voltage control register 11.

Note that each processor 7 executes the processing by using the specified piece of local time register 6, the specified piece of power supply circuit 8, the specified piece of clock supply circuit 9, the specified piece of clock control register 10 and the specified piece of voltage control register 11. To be specific, the processor 7a uses the local time register 6a, the power supply circuit 8a, the clock supply circuit 9a, the clock control register 10a and the voltage control register 11a. Further, the processor 7b employs the local time register 6b, the power supply circuit 8b, the clock supply circuit 9b, the clock control register 10b and the voltage control register 11b. The processor 7c uses the local time register 6c, the power supply circuit 8c, the clock supply circuit 9c, the clock control register 10c and the voltage control register 11c.

The main memory 2 provides the processor 7 with a storage area into which a program is loaded and an operation area, and is utilized as a buffer. The main memory 2 may be a semiconductor memory such as a RAM (Random Access Memory). The memory bus 3 is a signal line between the main memory 2 and the processor 7 and is employed for transferring and receiving signals of data, addresses, etc. The main clock supply circuit 4 supplies the time of a main clock, to which the plurality of processors can refer in common.

The global time register 5 counts the time of the main clock from a point of time when starting the task, and stores an elapsed period of time from the task starting time as the global time. The local time register 6 measures the execution time of the thread executed by the processor 7, and stores the measured execution time as local time.

The processor 7 executes the thread allocated by the information processing apparatus 1. The power supply circuit 8 supplies electric power to the processor 7, thereby driving the processor 7. The clock supply circuit 9 supplies the clock time to which the processor 7 can refer. The clock control register 10 stores a clock frequency specified by the processor 7. The voltage control register 11 stores a voltage value specified by the processor 7.

It is to be noted that FIG. 1 illustrates the local time registers 6, the processors 7, the power supply circuits 8, the clock supply circuits 9, the clock control registers 10 and the voltage control registers 11 on a three-by-three basis, however, it does not mean that there is a limit to the numbers of these components. It may be sufficient that the information processing apparatus 1 includes the plurality of processors 7, and each processor 7 includes the local time register 6, the power supply circuit 8, the clock supply circuit 9, the clock control register 10 and the voltage control register 11 of its own.

<Functional Blocks of Information Processing Apparatus>

Figure 2:
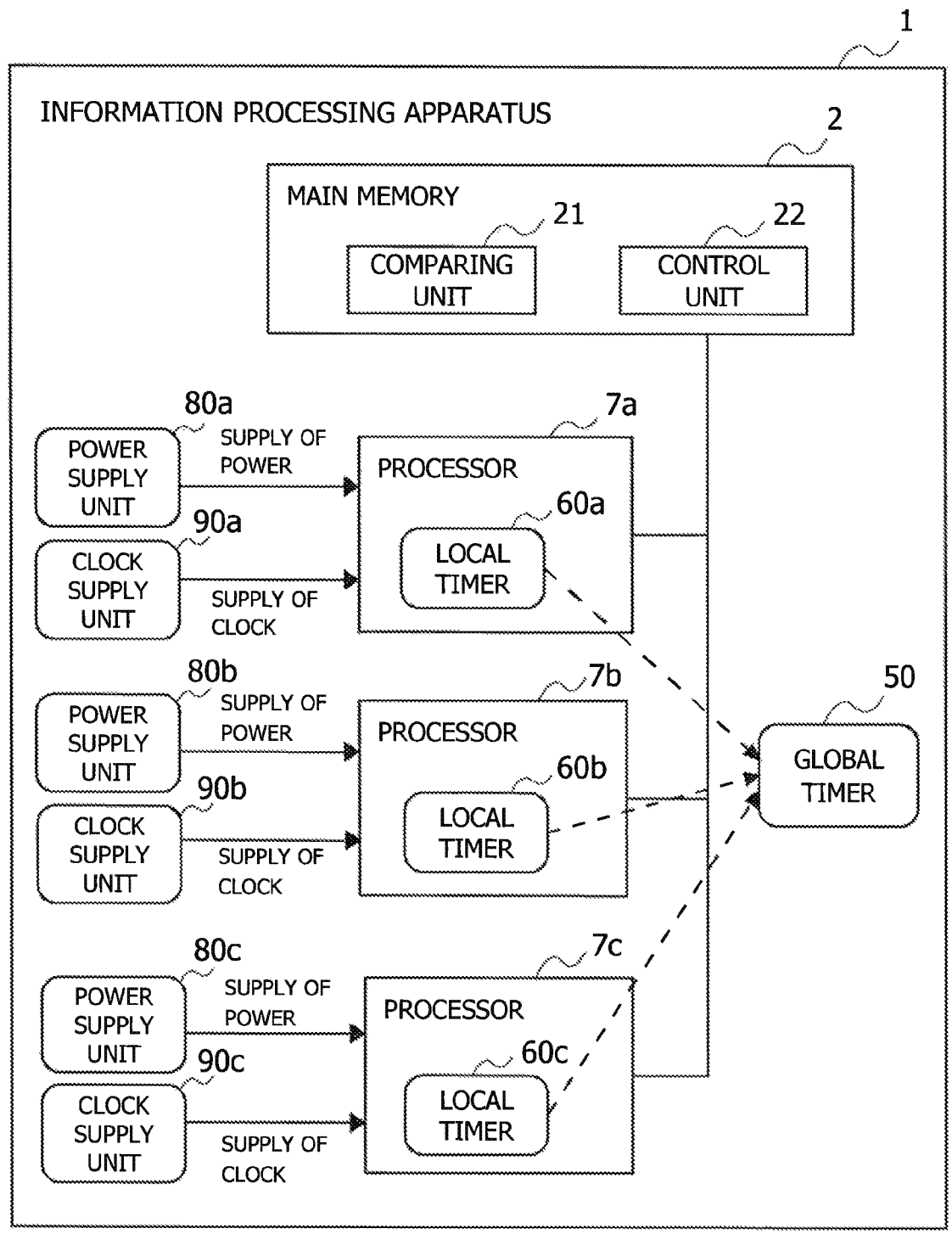
FIG. 2 is a functional block diagram of the information processing apparatus in a first working example.

FIG. 2 is a functional block diagram of the information processing apparatus 1 in the first working example. In FIG. 2, the information processing apparatus 1 includes the main memory 2, a global timer 50, the processors 7a, 7b, 7c, power supply units 80a, 80b, 80c and clock supply units 90a, 90b, 90c.

The global timer 50 is a common timer unit to measure the time in common among the plurality of processors. The global timer 50 counts the time of the main clock, and measures the elapsed time from the task starting time as the global time. The plurality of processors can refer to the global time in common.

The processor 7a includes a local timer 60a defined as an individual timer unit to measure the execution time of each processor. Further, the processor 7b includes a local timer 60b. The processor 7c includes a local timer 60c. The local timers 60a, 60b, 60c are, when generically termed, referred to as the local timer 60. Note that FIG. 2 illustrates three pieces of processors 7, which does not mean, however, that there is a limit to the number thereof. It may be sufficient that the information processing apparatus 1 includes the plurality of processors 7, and each processor includes its own local timer 60.

The local timer 60 measures the thread execution time as the local time in each processing environment of the processor 7. The local timer 60 measures the local time by any one of the following methods. A first method is that the local timer 60 starts measuring main clock when starting the execution of the thread but stops measuring the main clock during OS processing and IO (Input/Output) processing, thereby measuring the thread execution time. A second method is that the local timer 60 measures the execution time from the starting time when executing the thread by itself.

The power supply unit 80a supplies the electric power to the processor 7a. Further, the power supply unit 80b supplies the electric power to the processor 7b. The power supply unit 80c supplies the electric power to the processor 7c. The power supply units 80a, 80b, 80c are, when generically termed, referred to as the power supply unit 80. Note that the information processing apparatus 1 has the same number of power supply units 80 as that of the processors 7. Each processor 7 is supplied with the electric power from the unique power supply unit.

The clock supply unit 90a supplies the clock to the processor 7a. Moreover, the clock supply unit 90b supplies the clock to the processor 7b. The clock supply unit 90c supplies the clock to the processor 7c. The clock supply units 90a, 90b, 90c are, when generically termed, referred to as the clock supply unit 90. Note that the information processing apparatus 1 has the same number of clock supply units 90 as that of the processors 7. Each processor 7 is supplied with the clock from its own clock supply unit.

The main memory 2 stores program modules functioning as a comparing unit 21 and a control unit 22. The program modules are also called subprograms. Any one of the comparing unit 21 and the control unit 22 may be attained by a hardware circuit, a dedicated LSI (Large-Scale Integration), etc.

The comparing unit 21 compares the global time measured by the global timer 50 with the local time measured by the local timer 60. The control unit 22, when the local time is smaller than the global time, controls the clock frequency and the voltage value of the processor 7 with its processing being delayed, thereby accelerating the processing.

<Processing Flow>

Figure 3:
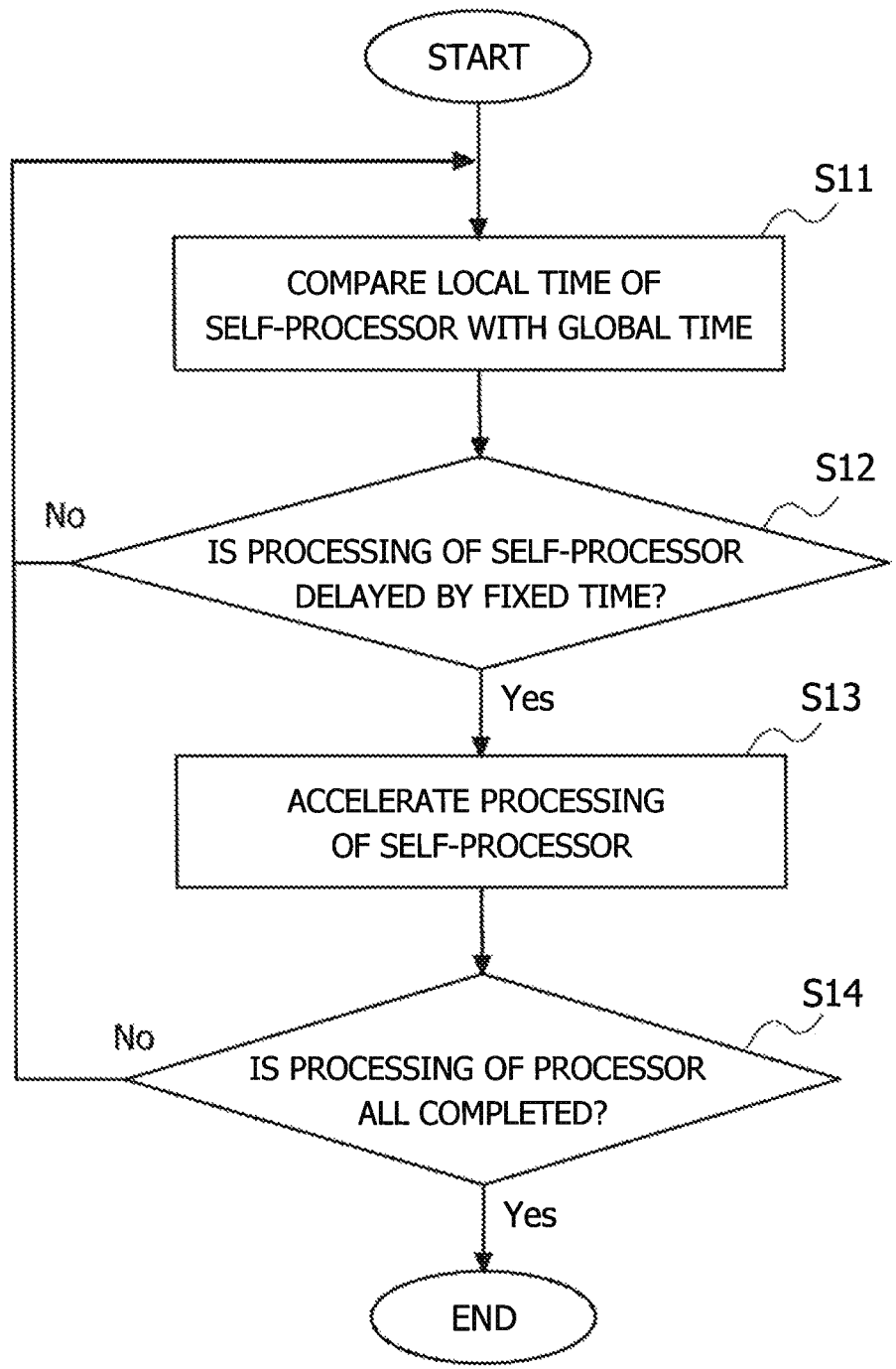
FIG. 3 is a flowchart illustrating one example of an execution control processing procedure of the processor in the first working example.

FIG. 3 is a flowchart illustrating one example of an execution control processing procedure of the processor in the first working example. In step S11, the processor 7 compares the local time measured by the local timer 60 with the global time measured by the global timer 50.

In step S12, the processor 7 determines based on the comparison in step S11 whether the processing of the self-processor 7 is delayed by a fixed period of time or not. The processor 7 moves to step S13 if the processing of the self-processor 7 is delayed by the fixed period of time, but loops back to step S11 whereas if not delayed.

In step S13, the processor 7 controls at least any one of the clock frequency and the voltage value of the self-processor, thereby accelerating the processing. For example, the processor 7 increases the clock up to a predetermined value by controlling the clock supply unit 90. Specifically, the processor 7 increases a set value of the clock frequency set in an unillustrated register. It does not, however, mean that there is a limit to the increased value of the clock frequency. For instance, the processor 7 may raise the clock frequency by a fixed value ($\Delta f$). Further, the processor 7 may increase the clock frequency f up to value f×R given by using a predetermined ratio R (1<R). It may be sufficient that the processor 7 retains the fixed value $\Delta f$ or the predetermined ratio R as a parameter in the unillustrated register or the main memory 2. Moreover, e.g., the processor 7 may increase a power source voltage in the information processing apparatus with its power source voltage being variable. For example, the processor 7 may also set the power source voltage at a maximum value within a variable range.

In step S14, the processor 7 determines whether the processing of each processor is all completed or not. The processor 7, if the processing of each processor is not all completed, loops back to step S11. The processor 7, whereas if the processing of each processor is all completed, finishes the execution control process of the processor.

The processor 7, if the processing time of the thread executed by the self-processor is delayed by the fixed period of time as compared with the global time, accelerates the processing. As a result, a period of synchronization waiting time between the threads, which has been so far a factor of hindering an improvement of performance in the parallel computing system in which the plurality of processors performs the processing, is reduced. The reduction of the synchronization waiting time enables the information processing apparatus 1 to improve a throughput of the parallel computing system on the whole.

Second Working Example

In the second working example, each of the plurality of processors compares the thread execution time in each individual processing environment with the thread execution time in the processing environment of another processor, thereby determining whether the processing of the self-processor advances ahead or not. Each processor, when determining that the processing of the self-processor advances ahead, restrains the processing.

<Hardware Architecture>

The hardware architecture of the information processing apparatus 1 in the second working example is the same as in the first working example, and hence its description is omitted.

<Functional Blocks of Information Processing Apparatus>

Figure 4:
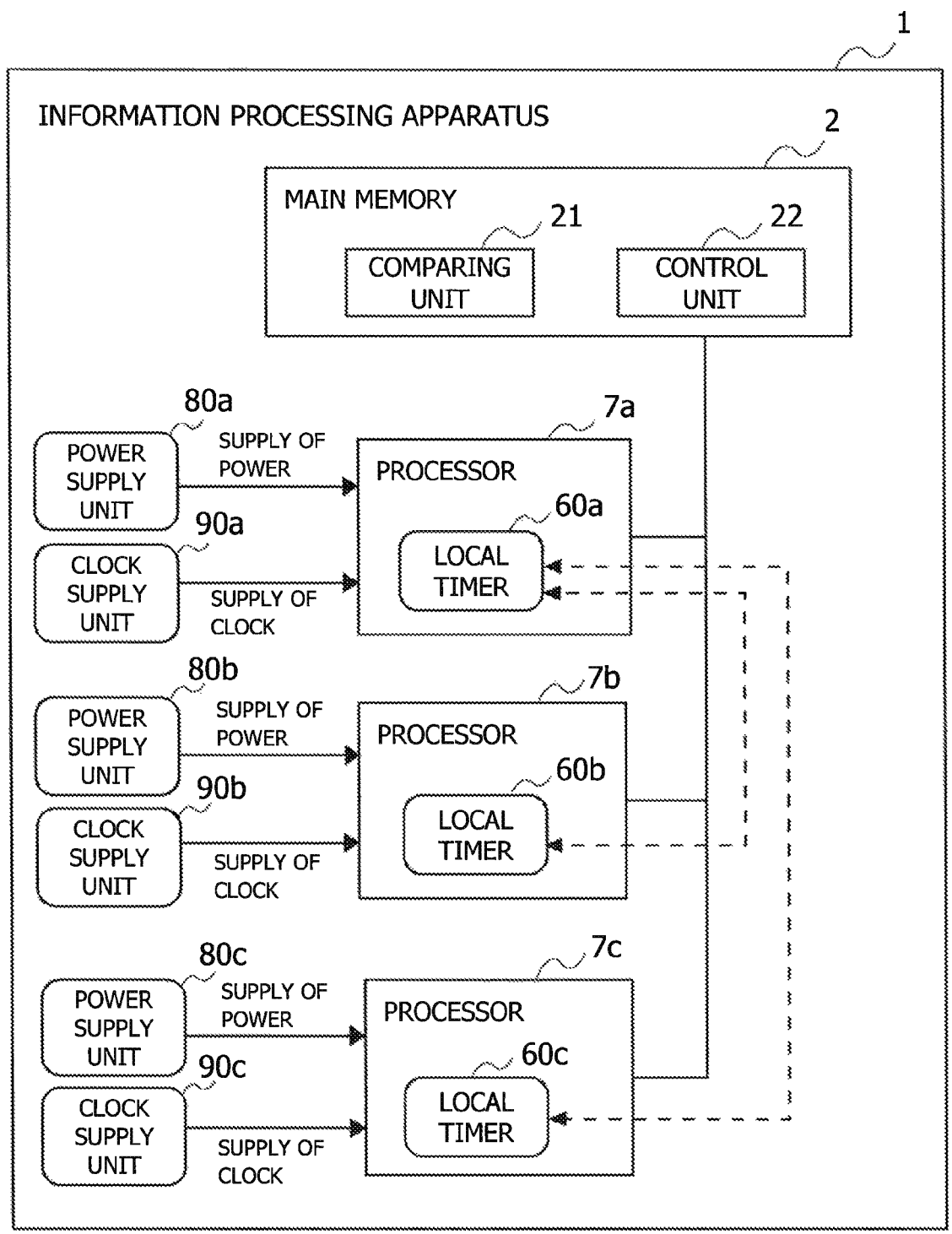
FIG. 4 is a functional block diagram of the information processing apparatus in a second working example.

FIG. 4 is a functional block diagram of the information processing apparatus in the second working example. In FIG. 4, the information processing apparatus 1 is the same as in the first working example except a point of not including the global timer 50, and therefore the explanation thereof is omitted. Incidentally, an assumption in the second working example is that the processor 7 can refer to the local time measured by the local timer 60 possessed by another processor.

<Processing Flow>

FIG. 5 is a flowchart illustrating one example of the execution control processing procedure of the processor in the second working example.

In step S21, the processor 7 compares the local time measured by the local timer 60 of the self-processor 7 with the local time measured by the local timer 60 of another processor 7. For example, the processor 7a compares the local time measured by the local timer 60a with the local time measured by the local timer 60b of another processor 7b. Moreover, the processor 7a compares the local time measured by the local timer 60a with the local time measured by the local timer 60c of another processor 7c.

In step S22, the processor 7 determines, based on the comparison in step S21, whether or not the processing of the self-processor advances ahead by the fixed time in comparison with the processing of another processor because of the local time measured by the local timer 60a of the self-processor being larger than the local time measured by the local timer 60b of another processor. The processor 7 moves to step S23 if the processing of the self-processor 7 advances ahead by the fixed time but loops back to step S21 whereas if the processing does not advance ahead.

In step S23, the processor 7 controls at least any one of the clock frequency and the voltage value of the self-processor, thereby restraining the processing. For example, the processor 7 decreases the clock down to a predetermined value by controlling the clock supply unit 90. Furthermore, e.g., the processor 7 may decrease the power source voltage in the information processing apparatus with its power source voltage being variable. For instance, the processor 7 may also set the power source voltage at a minimum value within the variable range.

In step S24, the processor 7 determines whether the processing of each processor is all completed or not. The processor 7, if the processing of each processor is not all completed, loops back to step S21. The processor 7, whereas if the processing of each processor is all completed, terminates the execution control process of the processor.

The processor 7, if the processing time of the thread executed by the self-processor is larger than the local time of another processor, restrains the processing. The processor 7 decreases the clock frequency to restrain the processing according to a delay occurred in another processor. As a result, it is feasible to reduce power consumption of the whole parallel computing system.

According to the technology of the disclosure, it is feasible to improve the throughput of the parallel computing system as a whole by reducing the execution time difference of the threads executed by the plurality of processors, i.e., to reduce the synchronization waiting time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a plurality of dedicated clock supply circuits configured to generate a clock signal;
   a plurality of processors, each of the plurality of processors being connected with a dedicated clock supply circuit;
   a main clock supply circuit configured to supply time information of a main clock to the plurality of processors; and
   a memory configured to store elapsed time information indicating elapsed period of time since a task starting time, the elapsed time information being updated according to the elapsed time since the task starting time, the task being executed by the information processing apparatus, the task including programs, the memory being coupled to the plurality of the processors;
   each of the plurality of processors executing a process that causes the information processing apparatus to perform:
   measuring, by a processor to which the first program is assigned, execution time of a first program based on the time information supplied by the main clock supply circuit, the first program being included in the task;
   comparing a program execution time of the processor to which the first program is assigned, the program execution time being measured based on the time information supplied by the main clock supply circuit, with the elapsed period of time indicated by the elapsed time information; and
   controlling processing of the processor to which the first program is assigned based on a result of the comparing,
   the controlling includes a process that frequency of the clock signal generated by the dedicated clock supply circuit connected to the processor to which the first program is assigned is varied.

2. The information processing apparatus according to claim 1, wherein the controlling includes accelerating the processing of the processor to which the first program is assigned when the program execution time measured based on the time information supplied by the main clock supply circuit is smaller than the elapsed period of time indicated by the elapse time information based on the result of the comparing.

3. The information processing apparatus according to claim 1, wherein the controlling includes restraining the processing of the processor to which the first program is assigned when the program execution time measured based on the time information supplied by the main clock supply circuit by the processor to which the first program is assigned is larger than the program execution time measured based on the time information supplied by the main clock supply circuit by another processor in the plurality of processor based on the result of the comparing.

4. The information processing apparatus according to claim 3, wherein the controlling includes restraining the processing of the processor to which the first program is assigned when the program execution time measured based on the time information supplied by the main clock supply circuit by the processor to which the first program is assigned is larger by a predetermined period of time than the program execution time measured based on the time information supplied by the main clock supply circuit by another processor in the plurality of processors based on the result of the comparing.

5. The information processing apparatus according to claim 1, wherein each of the processors is connected with a dedicated power unit, each of the processors being supplied with electric power by the dedicated power unit.

6. A method of controlling an information processing apparatus including a plurality of processors and a memory configured to store elapsed time information indicating elapsed period of time since a task starting time, the task being executed by the information processing apparatus, the task including programs, the memory being coupled to the plurality of the processors, the method of controlling the information processing apparatus comprising:
   measuring, by a processor to which the first program is assigned, execution time of a first program based on the time information supplied by a main clock supply circuit, a main clock supply circuit being configured to supply time information of a main clock to the plurality of processors, the first program being included in the task;
   comparing a program execution time of the processor to which the first program is assigned, the program execution time being measured based on the time information supplied by the main clock supply circuit, with the elapsed period of time indicated by the elapsed time information;
   updating the elapsed time information according to the elapsed time since the task starting time; and controlling processing of the plurality of processors based on a result of the comparing, the controlling includes a process that frequency of a clock signal generated by a dedicated clock supply circuit connected to the processor to which the first program is assigned is varied, a plurality of dedicated clock supply circuits being configured to generate a clock signal, each of the plurality of processors being connected with a dedicated clock supply circuit.

7. The method of controlling an information processing apparatus according to claim 6, wherein each of the processors are connected with a dedicated power unit, each of the processors being supplied with electric power by the dedicated power unit.

* * * * *